(12) United States Patent
Tona et al.

(10) Patent No.: US 11,111,897 B2
(45) Date of Patent: Sep. 7, 2021

(54) METHOD FOR CONTROLLING A WAVE POWER SYSTEM BY MEANS OF A CONTROL OBTAINED BY MINIMIZING AN OBJECTIVE FUNCTION WEIGHTED AND DISCRETIZED BY THE TRAPEZOIDAL RULE

(71) Applicant: IFP Energies nouvelles, Rueil-Malmaison (FR)

(72) Inventors: Paolino Tona, Lyons (FR); Hoai-Nam Nguyen, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 205 days.

(21) Appl. No.: 16/348,215

(22) PCT Filed: Oct. 26, 2017

(86) PCT No.: PCT/EP2017/077410
§ 371 (c)(1),
(2) Date: May 8, 2019

(87) PCT Pub. No.: WO2018/086894
PCT Pub. Date: May 17, 2018

(65) Prior Publication Data
US 2019/0277244 A1    Sep. 12, 2019

(30) Foreign Application Priority Data
Nov. 9, 2016 (FR) .................. 1660872

(51) Int. Cl.
*F03B 13/18* (2006.01)
*F03B 15/02* (2006.01)
(Continued)

(52) U.S. Cl.
CPC ............ *F03B 13/187* (2013.01); *F03B 13/16* (2013.01); *F03B 15/00* (2013.01); *F03B 15/02* (2013.01);
(Continued)

(58) Field of Classification Search
CPC ........ F03B 13/187; F03B 13/16; F03B 15/00; F03B 15/02; F03B 13/1845; Y02E 10/30;
(Continued)

(56) References Cited

U.S. PATENT DOCUMENTS 7,989,975 B2 * 8/2011 Clement ................. F03B 13/20
290/53
2009/0008942 A1   1/2009 Clement et al.
(Continued)

FOREIGN PATENT DOCUMENTS

FR    2 876 751 A1    4/2006
FR    2 973 448 A1    10/2012
(Continued)

OTHER PUBLICATIONS

Tona et al., An Efficiency-Aware Model Predictive Control Strategy for a Heaving Buoy Wave Energy Converter, Sep. 2015, 11th European Wave and Tidal Energy Conference—EWTEC 2015, Nantes, France, <http://www.ewtec.org/conferences/ewtec-2015/>. <hal-01443855>, pp. 1-11.*
(Continued)

*Primary Examiner* — Juan C Ochoa
(74) *Attorney, Agent, or Firm* — Fitch, Even, Tabin & Flannery LLP

(57) ABSTRACT

The present invention provides improvement of the operation of a wave energy system by use of a method for predictive control (COM) of the converter machine that maximizes the energy generated by considering the energy conversion efficiency (MOD ENE) and a wave prediction
(Continued)

(PRED). Furthermore, the method according to the invention determines the optimal control by minimizing an objective function weighted and discretized by the trapezoidal rule.

23 Claims, 5 Drawing Sheets

(51) Int. Cl.
*F03B 13/16* (2006.01)
*F03B 15/00* (2006.01)

(52) U.S. Cl.
CPC ..... *F05B 2240/40* (2013.01); *F05B 2260/821* (2013.01); *F05B 2260/84* (2013.01); *F05B 2270/1033* (2013.01); *F05B 2270/20* (2013.01); *F05B 2270/30* (2013.01); *Y02E 10/30* (2013.01)

(58) Field of Classification Search
CPC ............... Y02E 10/38; F05B 2240/40; F05B 2270/1033; F05B 2260/821; F05B 2260/84; F05B 2270/20; F05B 2270/30; F05B 2270/404; H02P 9/008
USPC ..................................................... 703/2, 4, 7
See application file for complete search history.

(56) References Cited

U.S. PATENT DOCUMENTS

| 2010/0148504 A1* | 6/2010 | Gerber ................. F03B 13/16 290/42 |
| 2011/0074159 A1* | 3/2011 | Stromotich ......... F03B 13/1845 290/53 |
| 2014/0084586 A1 | 3/2014 | Henwood et al. |
| 2016/0237980 A1 | 8/2016 | Prins |
| 2017/0214347 A1 | 7/2017 | Saupe et al. |

FOREIGN PATENT DOCUMENTS

| FR | 3 019 235 A1 | 10/2015 |
| WO | 2009/081042 A1 | 7/2009 |
| WO | 2012/131186 A2 | 10/2012 |
| WO | 2015/150102 A1 | 10/2015 |

OTHER PUBLICATIONS

Wachter and Biegler, "On the implementation of an interiorpoint filter line-search algorithm for large-scale nonlinear programming", 2006, Mathematical Programming, vol. 106 (1), pp. 25-57.*
International Search Report for PCT/EP2017/077410, dated Mar. 20, 2018; English translation submitted herewith (7 pgs.).
Giorgio Bacelli et al: "A control system for a self-reacting point absorber wave energy converter subject to constraints", Aug. 1, 2011 (Aug. 1, 2011), XP055153399, DOI: 10.3182/20110828-6-IT-1002.03694 Retrieved from the Internet: URL:http://eprints.nuim.ie/3555.

* cited by examiner

METHOD FOR CONTROLLING A WAVE POWER SYSTEM BY MEANS OF A CONTROL OBTAINED BY MINIMIZING AN OBJECTIVE FUNCTION WEIGHTED AND DISCRETIZED BY THE TRAPEZOIDAL RULE

CROSS REFERENCE TO RELATED APPLICATIONS

Reference is made to PCT/EP2017/077410 filed Oct. 26, 2017, and French Application No. 16/60.872 filed Nov. 9, 2016, which are incorporated herein by reference in their entirety.

BACKGROUND OF THE INVENTION

Field of the Invention

The invention relates to devices for converting wave energy to electrical or hydraulic energy.

Description of the Prior Art

Renewable energy resources have generated strong interest for years. They are clean, free and inexhaustible, which are major assets in a world facing the inexorable depletion of the available fossil resources and recognizing the need to preserve the planet. Among these resources, wave energy, a source relatively unknown amidst those widely publicized, such as wind or solar energy, contributes to the vital diversification of the exploitation of renewable energy sources. The devices, commonly referred to as "wave energy devices", are particularly interesting because they allow electricity to be produced from this renewable energy source (the potential and kinetic wave energy) without greenhouse gas emissions. They are particularly well suited for providing electricity to isolated island sites.

For example, patent applications FR-2,876,751, FR-2,973,448 and WO-2009/081,042 describe devices for capturing the energy produced by the sea water forces. These devices are made up of a floating support structure on which a pendulum is movably mounted with respect to the floating support. The relative motion of the pendulum with respect to the floating support is used to produce electrical energy by use of an energy converter machine (an electrical machine for example). The converter machine operates as a generator and as a motor. Indeed, in order to provide a torque or a force driving the mobile device, power is supplied to the converter machine to bring it into resonance with the waves (motor mode). On the other hand, to produce a torque or a force that withstands the motion of the mobile device, power is recovered via the converter machine (generator mode).

The motion of the mobile device is thus controlled by the energy converter machine to promote energy recovery. In order to optimize the electrical energy recovered by wave energy systems, various converter machine control methods have been considered. Some are not optimal because the wave motion prediction is not taken into consideration. Furthermore, these methods do not account for the energy losses upon energy conversion in the wave energy system. For example, patent application FR-2,973,448 (WO-2012/131,186) describes such a method.

Other methods combine model predictive control with a wave motion prediction algorithm. However, these algorithms do not allow the energy losses upon energy conversion in the wave energy system to be taken into account, which does not enable an optimal control which maximizes the recovered energy. For example, the following document describes such a method: Giorgio Bacelli, John Ringwood and Jean-Christophe Gilloteaux, "A Control System for a Self-Reacting Point Absorber Wave Energy Converter Subject to Constraints", in: Proceedings of $18^{th}$ IFAC World Congress, International Federation of Automatic Control (IFAC), 2011, pp. 11387-11392.

The predictive control approach described in patent application FR-3,019,235 (WO-2015/150,102) is the first to take explicit account of the energy conversion efficiency in the objective function, for guaranteeing maximization of the electrical power produced by the wave energy system. Subject to availability of a sufficiently precise short-term wave prediction, this formulation perfectly meets the expectations in terms of performance, because it can be shown that the energy recovered with several sea states is always very close to the attainable maximum. On the other hand, long and complex calculations are necessary to obtain the optimal solution, which can make real-time implementation on the wave energy system difficult or even impossible, depending on the power of the available control calculator. The computational complexity is due to the non-convexity of the quadratic objective function which, coupled with a large number of unknowns, requires using a large-scale non-linear optimization algorithm.

SUMMARY OF THE INVENTION

To overcome these drawbacks, the present invention improves the operation of a wave energy system by use of a converter predictive control method that maximizes the energy generated by accounting for the energy conversion efficiency and of a wave prediction. Furthermore, the method according to the invention determines the optimal control by minimizing an objective function weighted and discretized by the trapezoidal rule. Thus, the control method according to the invention allows determining the control that maximizes the average power recovered with reduced computation times, because optimization of the discretized and weighted objective function leads to a strictly convex quadratic programming problem, which can be solved with very efficient algorithms.

The invention relates to a method of controlling a wave energy system that converts the energy of waves into electrical or hydraulic energy with the wave energy system comprising at least one mobile device that cooperates with at least one energy converter machine, and the mobile device having an oscillating motion with respect to the converter machine. For this method, the following steps are carried out:

a) constructing a dynamic model of the wave energy system relating the velocity of the mobile device to the force exerted by the waves on the mobile device and to the force exerted by the converter machine on the mobile device;

b) constructing an energy model of the wave energy system relating the average power generated by the converter machine to the force exerted by the converter machine on the mobile device, to the velocity of the mobile device and to the efficiency of the wave energy system;

c) predicting the force exerted by the waves on the mobile device for a predetermined time period;

d) determining a control value of the force exerted by the converter machine on the mobile device maximizing the average power generated by the converter machine, by carrying out the following steps:

i) determining an objective function representative of power generated by the converter machine by use of the prediction of the force exerted by the waves on the mobile device, of the dynamic model and of the energy model;

ii) discretizing the objective function by the trapezoidal rule;

iii) weighting, in the discretized objective function, future values of the control by predetermined weighting coefficients;

iv) deducing the control value from the force exerted by the converter machine on the mobile device by minimizing the discretized and weighted objective function; and e) controlling the converter machine by use of the control value.

According to an embodiment of the invention, the discretized and weighted objective function J is written as follows: $J=\sum_{j=0}^{N_p-2} q_j u_a(k+j|k)(v(k+j|k)+v(k+j+1|k))$, with $q_j$ being the weighting coefficients, $u_a$ being the force exerted by the converter machine on the mobile device, v being the velocity of the mobile device and Np being the number of discrete time steps contained in the prediction horizon.

Advantageously, the discretized and weighted objective function J is written in matrix form:

$$J = u_e^T H u_e + 2 u_e^T f \begin{bmatrix} x(k|k) \\ w_e \end{bmatrix},$$

with $u_e$ being a vector of the force exerted by the converter machine on the mobile device, x being the state vector of the model of the wave energy system with its converter machine, $w_e$ being the vector of the wave force predictions, H being the weighting matrix on vector $u_e$, f being the weighting matrix on the current state x of the global dynamic model of the wave energy system and the vector of the wave force predictions $w_e$.

Preferably, the negative or zero eigenvalues of the weighting matrix H are replaced by predetermined positive eigenvalues.

According to an implementation, the force exerted by the waves on the mobile device is predicted by at least one measurement or one estimation of the force exerted by the waves on the mobile device, notably using a set of pressure detectors arranged in the vicinity of the mobile device or force sensors arranged between the mobile device and the converter machine.

According to a variant, the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x being the state vector of the wave energy system with the converter machine, u being the control of the force exerted by the converter machine on the mobile device, w being the excitation force of the incident waves on the mobile device, Ac, Bcu, Bcw, and Cc being matrices multiplying the state, and the inputs of the dynamic model allowing calculation of the dynamic variation of the state and the outputs of the dynamic model.

According to a feature, the dynamic model of the wave energy system incorporates ideal dynamics of the converter machine, considering the quasi-instantaneous control of the converter machine in relation to the dynamics of the wave energy system.

According to an embodiment option, the energy model is written with a formula of:

$$P_a = -\frac{1}{T} \int_{t=0}^{T} \eta u_a v \, dt,$$

with $P_a$ being the average power generated, t being time, T being a predetermined duration, η being the energy conversion efficiency, u being the force exerted by the converter machine on the mobile device and v being the velocity of the mobile device in relation to the converter machine.

Preferably, the efficiency η is a function of force $u_a$ exerted by the converter machine on the mobile device and of velocity v of the mobile device in relation to the converter machine.

Advantageously, the efficiency η is calculated with a formula of:

$$\eta(u_a v) = \begin{cases} \eta_p & \text{if } u_a v \geq 0 \\ \eta_n & \text{if } u_a v < 0 \end{cases},$$

with $\eta_p$ being the motor efficiency of the converter machine, $\eta_n$ being the generator efficiency of the converter machine, with $0 < \eta_p \leq 1$ and $\eta_n \geq 1$.

According to an embodiment, the method comprises a prior step of optimizing the weighting coefficients using a genetic algorithm, or particle swarm optimization, or variable neighborhood search, or the Nelder-Mead method.

According to an implementation, steps c), d) and e) are repeated for a predictive control with moving horizon.

Preferably, the energy converter machine is an electrical or hydraulic machine.

BRIEF DESCRIPTION OF THE DRAWINGS

Other features and advantages of the method according to the invention will be clear from reading the description hereafter, with reference to the accompanying figures wherein.

DETAILED DESCRIPTION OF THE INVENTION

Figure 1:
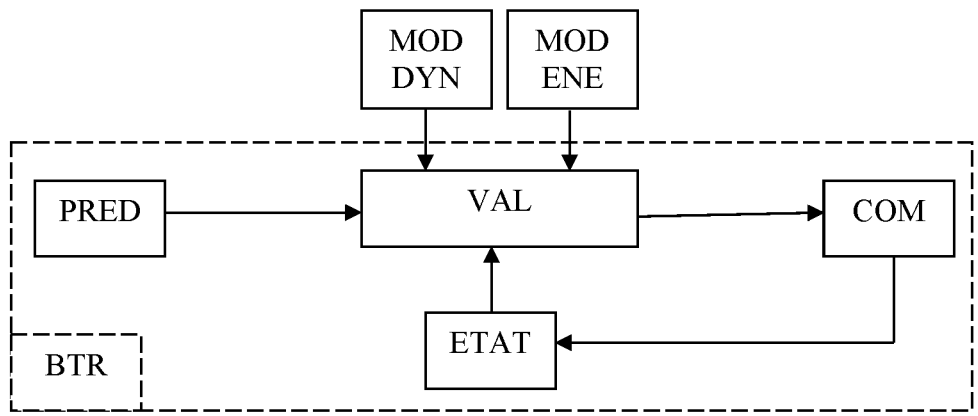
FIG. 1 illustrates the steps of the method according to the invention.

The invention relates to a method of controlling a wave energy system that comprises at least one mobile device (a float for example) cooperating with at least one energy converter machine (also referred to as Power Take-Off PTO). The mobile device has an oscillating motion with respect to the converter machine, under the action of the waves (or wave motion) and of the converter machine. The converter machine converts the mechanical energy of the motion of the mobile device into electrical energy. The converter machine can therefore be an electrical machine or a hydraulic machine. The converter machine can be considered as the actuator through which the control system drives the operation of the wave energy system.

Notations

The following notations are used in the description below:
- $u_a$: force exerted by the converter machine on the mobile device, also denoted by $F_u$, and;
  - u: value of the force control requested from the converter machine on the mobile device by the control system of the wave energy system (which implements the control method according to the invention);
- w: force exerted by the waves on the mobile device (also denoted by $F_{ex}$);
- z: position of the mobile device with respect to the equilibrium point thereof;
- v: velocity of the mobile device, also denoted by $\dot{z}$;
- $\ddot{z}$: acceleration of the mobile device;
- M: mass of the mobile device;
- $F_{hyd}$: hydrostatic restoring force;
- K: hydrostatic stiffness coefficient;
- $F_{rad}$: radiation force;
- Fr: impulse response of the radiation force;
- $M_\infty$: infinite-frequency added mass;
- $x_a$: state vector of the model of the converter machine of the wave energy system;
- $A_a$, $B_a$, $C_a$, and $D_a$: matrices of the state representation of the linear model of the wave energy system converter machine that is integrated in the global dynamic model for the control;
- $x_r$: internal state of the state representation of the impulse response of the radiation force component due to the velocity of the float;
- $A_r$, $B_r$, $C_r$, and $D_r$: matrices of the state representation of the impulse response of the radiation force component due to the velocity of the float;
- x: state vector of the wave energy system model with its converter machine;
- y: vector of the outputs of the global dynamic model of the wave energy system with its converter machine, which are: the float velocity $\dot{z}$ and the force applied by the converter machine to the wave energy system u_a;
- $A_c$, $B_{cu}$, $B_{cw}$, and $C_c$: matrices of the continuous-time state representation of the global dynamic model of the wave energy system with its converter machine. The wave energy system model can be calculated by a balance of forces by use of hydrostatic coefficients, calculated or identified experimentally or directly by an experimental identification procedure, and it notably encompasses the radiation force model. If the model is linear, it can be represented by these matrices (it is a formalism). This model connects the force exerted by the waves on the mobile device w and the control of the force requested from the converter machine u to the velocity of the mobile device v (or $\dot{z}$);
- A, $B_u$, $B_w$, C, $D_w$, and $D_w$: matrices of the discrete-time state representation of the wave energy system including the converter machine, obtained by discretizing with Tustin's method the continuous-time representation for a given sampling period. This state representation is used for synthesis of the control;
- $P_a$: average power generated by the wave energy system;
- t: continuous time;
- k: discrete time;
- T: predetermined duration;
- η: energy conversion efficiency, with
  - $\eta_p$: motor efficiency of the converter machine; these are manufacturer's data or experimentally determined data;
- $T_p$: prediction horizon;
- $N_p$: number of discrete time steps contained in the prediction horizon;
- $q_j$: weighting coefficients to be applied to the power prediction extracted at each j of the prediction horizon, j=1, 2, . . . , $N_p-2$;
- $u_e$: vector of the force controls given to the converter machine for each step of the prediction horizon;
- H: weighting matrix on vector $u_e$;
- $w_e$: vector of the wave force predictions; and
- f: weighting matrix on the current state x of the global dynamic model of the wave energy system and the vector of the wave force predictions $w_e$.

For these notations, the time derivative is denoted by a dot above the variable considered. Time is denoted by t (continuous variable) or k (discrete variable).

In the description below and for the claims, the terms waves, sea waves and wave motion are considered to be equivalent.

The invention relates to a method of controlling a wave energy system. FIG. 1 shows the various steps of the method according to the invention:
1. Construction of a dynamic model (MOD DYN)
2. Construction of an energy model (MOD ENE)
3. Prediction of the force exerted by the waves (PRED)
4. Estimation of the state of the system (ETAT)
5. Determination of the control value (VAL)
6. Control of the converter machine (COM).

Steps 1 and 2 are steps that can be carried out beforehand. They are part of a calibration procedure when the machine is installed. Steps 3 to 6 are carried out in real time, in a real-time loop (BTR).

According to a variant embodiment, the method can comprise an additional optional step that determines weighting coefficients. This step can be carried out offline after steps 1 and 2, using steps 4 to 6. This optional step is described more in detail in the description of weighting step 5)iii.

Advantageously, the control method according to the invention can be implemented using a computation device, such as a computer for example.

Step 1—Construction of a Dynamic Model (MOD DYN)

In this step, a dynamic model of the wave energy system is constructed. The dynamic model represents the dynamic behavior reflecting the motion of the elements making up the wave energy system under the action of the waves and under the action of the force control transmitted to the converter machine. The dynamic model is a model that relates the velocity of the mobile device to the force exerted by the waves on the mobile device and to the force control given to the converter machine, which in turn translates into a force exerted by the converter machine on the mobile device.

According to an embodiment of the invention, the dynamic model can be obtained by applying the fundamental principle of dynamics to the mobile device of the wave energy system. For this application, the force exerted by the waves on the mobile device and the force exerted by the converter machine on the mobile device are notably taken into account.

Figure 2:
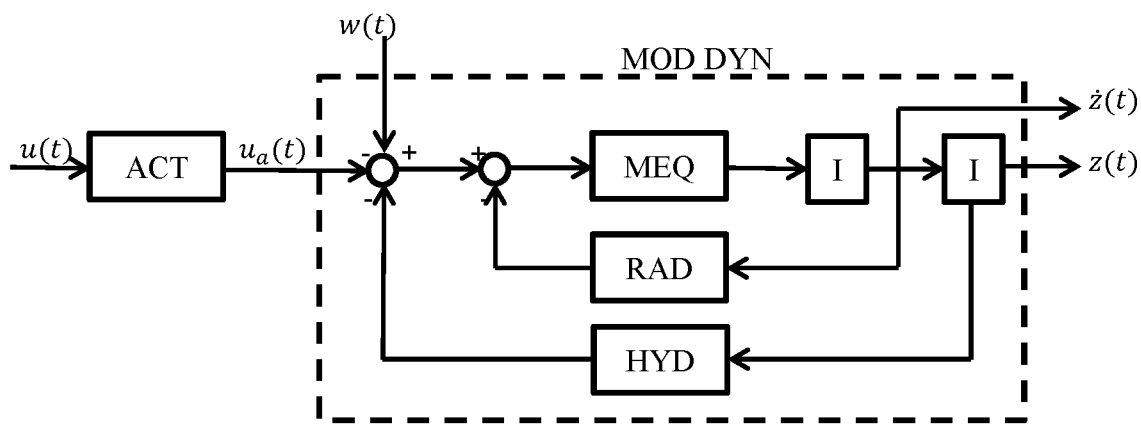
FIG. 2 illustrates the dynamic model according to an embodiment of the invention.

FIG. 2 schematically illustrates, by way of a non-limiting example, the construction of the dynamic model according to an embodiment of the invention. The model input is the control force requested from the converter machine u(t) that is converted to the force exerted by the converter machine on the mobile device $u_a(t)$ by use of actuator ACT. Actuator ACT is none other than the converter machine extended with its own control system, allowing delivery of the required force control u(t). The power delivered to the mobile device by the converter machine $u_a(t)$ and the force w(t) exerted by the waves on the mobile device are then involved in the part of the model corresponding to the dynamics of the mobile device (MOD DYN), the mechanical and hydrodynamic operation thereof. It notably includes the equivalent mass of the mobile device (MEQ), the damping due to the radiation force (RAD) and a hydrostatic restoring term (HYD). By use of integrators (I), this model allows calculation of the relative position z(t) and the velocity of the mobile device $\dot{z}(t)$.

According to an implementation of the invention, the actuator can be considered to be ideal, that is capable of instantly translating u(t) into $u_a(t)$, i.e. $u_a(t)=u(t)$. It is an approximation that is justified when the dynamics of the actuator are much faster than that of the mobile device.

According to an implementation of the invention, a wave energy system with a floating part (mobile device) whose translational or rotational oscillatory motion is constrained in a single dimension is considered. It is assumed that the translational or rotational motion can be described by a linear model in a form of a state representation that includes the dynamics of the float with its interaction with the waves and the dynamics of the power take-off system (PTO), or converter machine, which is the actuator of the system.

In the rest of the description, only a one-directional motion is considered for the dynamic model. However, the dynamic model can be developed for a multi-directional motion.

The part of this model concerning the dynamics of the float (mobile device) with its interaction with the waves can be obtained in a standard manner by applying the linear wave theory (from the fundamental principle of dynamics):

$$M\ddot{z}(t) = F_{ex}(t) + F_{hd}(t) + F_{rad}(t) - F_u(t)$$

where M is the total mass of the mobile device and of all the parts of the machine integral with the float; $\ddot{z}$ is its acceleration (z being its position, calculated as a deviation from the equilibrium point, and $\dot{z}$ is its velocity); $F_{ex}$ is the excitation force of the incident wave, also including the effects of diffraction, $F_u$ is the force exerted by the PTO, $F_{hd}$ is the hydrostatic restoring force and $F_{rad}$ is the radiation force.

For a float whose main motion is pitch, the mass can be replaced by the moment of inertia, the acceleration by the angular acceleration $\ddot{\theta}$ and the forces by the moments of force (or torques) $M_{ex}$, $M_{hd}$, $M_{rad}$ and $M_u$, i.e.:

$$J\ddot{\theta} = M_{ex}(t) + M_{hd}(t) + M_{rad}(t) - M_u(t)$$

In what follows, the dynamic model of the wave energy system is written in the following way:

$$M\ddot{z}(t) = F_{hd}(t) + F_{rad}(t) + w(t) - u_a(t)$$

where $w(t) = F_{ex}(t)$ which is the excitation force of the incident wave, and $u_a(t) = F_u(t)$, is the force exerted by the PTO on the float, which are the two inputs of the system. The first one is undergone whereas the second one allows the system to be controlled. $u_a$ is considered as resulting in turn from a dynamic system relating the force really exerted by the PTO to u(t), which is the control of the force requested from the PTO (converter machine). This system can be written in form of a state representation:

$$\begin{cases} \dot{x}_a(t) = A_a x_a(t) + B_a u(t) \\ u_a(t) = C_a x_a(t) + D_a u(t) \end{cases}$$

Thus, with $D_a = 0$, the control model of the dynamics of the wave energy system actuator can be accounted for, which may not be negligible (that is which may not be fast enough to be disregarded) in relation to the dynamics of the wave energy system. And, with $A_a = 0$, $B_a = 0$, $C_a = 0$, $D_a = 1$, $u_a(t) = u(t)$, the case of the perfect actuator with the negligible dynamics (in relation to the own dynamics of the wave energy system) can be considered.

The hydrostatic restoring force can be considered as a linear function of z(t):

$$F_{hd}(t) = -Kz(t)$$

where K is the hydrostatic stiffness coefficient.

Then, still according to the linear wave theory, the radiation force can be calculated by use of an equation:

$$F_{rad}(t) = -M_\infty \ddot{z}(t) - F_r(t)$$

where $M_\infty$ is the infinite-frequency added mass, and $$F_r(t) = \int_0^t h(t-\tau)\dot{z}(\tau)d\tau$$

is the impulse response of the radiation force component due to the velocity of the float, which can be approximated numerically by the boundary element method (BEM) or analytically for particular (very simple) float geometries. The previous equation can be considered to be a linear system with $F_r(t)$ as the output and $\dot{z}(\tau)$ as the input. In the (Laplace) frequency domain, with Prony's method:

$$F_r(s) = W_r(s)\dot{z}(s) \text{ is obtained}$$

where $W_r(s)$ is a transfer function, and $F_r(s), W_r(s)$ and $\dot{z}(s)$ are the Laplace transforms of $F_r(t)$, $h(t)$ and $\dot{z}(t)$ respectively. This equation in the Laplace domain can be put in equivalent state form, for example:

$$\begin{cases} \dot{x}_r(t) = A_r x_r(t) + B_r \dot{z}(t) \\ F_r(t) = C_r x_r(t) + D_r \dot{z}(t) \end{cases}$$

where $x_r$ is an internal state with no particular physical meaning and $A_r$, $B_r$, $C_r$, and $D_r$ are the matrices of the state realization.

By defining:

$$\begin{cases} x_1(t) = z(t) \\ x_2(t) = \dot{z}(t) \end{cases}$$

the global model (that is including the dynamics of the float and that of the actuator) can be written as follows:

$$\begin{cases} \dot{x}_1(t) = x_1(t) \\ \dot{x}_2(t) = -\dfrac{K}{J+J_\infty} x_1(t) - \dfrac{D_r}{J+J_\infty} x_2(t) - \\ \quad \dfrac{C_r}{J+J_\infty} x_r(t) - \dfrac{C_a}{J+J_\infty} u_a(t) + \dfrac{1}{J+J_\infty} w(t) \\ \dot{x}_r(t) = B_r x_2(t) + A_r x_r(t) \\ \dot{x}_a(t) = A_a x_a(t) + B_a u(t) \\ u_a(t) = C_a x_a(t) \end{cases}$$

When returning to the initial equation (application of the linear wave theory to the float), the wave energy system dynamics can be put in state representation form as follows:

$$\begin{cases} \dot{x}(t) = A_c x(t) + B_{cu} u(t) + B_{cw} w(t) \\ y(t) = C_c x(t) \end{cases}$$

where $x(t) = \begin{bmatrix} x_1(t) \\ x_2(t) \\ x_r(t) \\ x_a(t) \end{bmatrix}$, $y(t) = \begin{bmatrix} x_2(t) \\ u_a(t) \end{bmatrix}$ and $$A_c = \begin{bmatrix} 0 & 1 & 0 & 0 \\ -\dfrac{K}{J+J_\infty} & -\dfrac{D_r}{J+J_\infty} & -\dfrac{C_r}{J+J_\infty} & -\dfrac{C_a}{J+J_\infty} \\ 0 & B_r & A_r & 0 \\ 0 & 0 & 0 & A_a \end{bmatrix},$$

$$B_{cu} = \begin{bmatrix} 0 \\ 0 \\ 0 \\ B_a \end{bmatrix}, \; B_{cw} = \begin{bmatrix} 0 \\ \dfrac{1}{J+J_\infty} \\ 0 \\ 0 \end{bmatrix} \; C_c = \begin{bmatrix} 0 & 1 & 0 & 0 \\ 0 & 0 & 0 & C_a \end{bmatrix}.$$

For simplicity reasons, only the velocity of the float may be considered. The position does therefore not appear among the outputs of the state representation. However, other dynamic models taking account of the position can be applied to the control method according to the invention.

Step 2—Construction of an Energy Model (MOD ENE)

In this step, an energy model of the wave energy system is constructed. The energy model represents the energy balance between the energy generated by the converter machine (that is the energy supplied to the grid) and the wave energy. According to the invention, this model accounts for the imperfect efficiency of the conversion of mechanical energy to electrical or hydraulic energy, and of the imperfect efficiency of the conversion of electrical or hydraulic energy to mechanical energy. The energy model relates the average power generated by the converter machine to the force exerted by the converter machine on the mobile device, to the velocity of the mobile device and to the efficiency of the energy converters.

According to an embodiment of the invention, the energy model of the wave energy system can be determined from the average power that is generated by the converter machine PTO for a duration T, which can be calculated with a formula of the type:

$$P_a = \frac{1}{T} \int_{t=0}^{T} \eta u_a(t) v(t) dt.$$

If the purpose of the wave energy system is to generate electrical power, it is the generated average electrical power. The definition of the above generated average power is such that the average power has a negative sign if the energy is extracted from the system (generated energy) and for example supplied to the power grid. A maximization of the generated average power therefore corresponds to a minimization of this power.

According to the invention, function $\eta$ is used to model an imperfect efficiency of the energy conversion chain. In this case, the amount of energy generated in motor mode is decreased and the cost of the energy supplied to the system (to bring it into resonance with the waves in motor mode) increases. A simple model using the hypothesis can be written with an equation of the type:

$$\eta(u_a v) = \begin{cases} \eta_p & \text{if } u_a v \geq 0 \\ \eta_n & \text{if } u_a v < 0 \end{cases},$$

where the motor and generator efficiencies satisfy the inequations as follows: $0 < \eta_p \leq 1$ and $\eta_n \geq 1$. These efficiencies depend on the converter machine of the wave energy system and can even be a function of $u_a v$.

Step 3—Prediction of the Force Exerted by the Waves (PRED)

In this step, the force exerted by the waves on the mobile device is predicted in real time for a future period of predetermined duration T. This predetermined duration T can be short, ranging for example from 5 to 10 seconds. A prediction method is then selected and applied to the time being considered.

According to an embodiment, the future values of the force exerted on the mobile device by the waves can be extrapolated using, for example, an autoregressive model identified online, for example as described in French patent application No. FR-15/60,260.

According to an alternative, the force exerted by the waves on the mobile device is predicted using a set of pressure detectors arranged upstream from the device. These detectors can notably measure the elevation and the frequency of the waves, and these measurements can be used to reconstruct the force of the waves downstream from the device.

Since the force exerted by the waves on the mobile device is not directly measurable in real time during the normal operation of the wave energy system, it has to be inferred or estimated from detectors available on the wave energy system or detectors arranged upstream from the wave energy system. According to an alternative, a set of detectors arranged upstream from the device is used to measure notably the elevation and the frequency of the waves in order to reconstruct the force of the waves on the device downstream therefrom and to simultaneously provide a short-term prediction. According to an embodiment of the invention, one option estimates in real time the force exerted on the mobile device by the waves with, for example, a set of pressure detectors arranged in the vicinity of the mobile device or force detectors between the mobile device and the converter machine, or wave elevation detectors.

In a variant, the force exerted by the waves on the mobile device can be estimated in real time using a method of determining the excitation force exerted by the incident waves on a mobile device of a wave energy system, by device of a radiation force model as described in French patent application No. FR-16/53,109.

Step 4—Estimation of the State of the System (ETAT)

In this step, the current state of the wave energy system is determined in real time. For this step, the current state can be estimated by use of a system state observer. This state observer can be achieved by synthesis of a Kalman filter from the dynamic model of the wave energy system. For example, the observer is constructed from the linear models described in step 1.

Furthermore, the observer can take the current control of the converter machine into account to determine the current state of the wave energy system, for example by use of the control at the times preceding the time considered.

Step 5—Determination of the Control Value (VAL)

In this step, a control value of the force exerted by the converter machine on the mobile device is determined in real time which maximizes the average power generated by the converter machine. Determination is therefore performed using the prediction of the force exerted by the waves (step 3), the dynamic model (step 1) and the energy model (step 2). Furthermore, this determination can be achieved by taking the state of the system into account (step 4).

Using the prediction of the force exerted by the waves gives the predictive characteristic of the control method according to the invention. Using an energy model taking account of the energy conversion efficiency involves consideration of the energy losses, which enables an optimal control that maximizes the average power generated by the converter machine.

Indeed, if efficiency η is different from 1, the product between control u and optimal velocity v changes significantly due to the cost of the energy supplied to the machine, notably related to the energy losses.

With the formulations of the dynamic and energy models, the search for the optimal control with constraints on control u and on the state of the system x can be formulated in a general manner: min $P_a$ as a function of the models and the following constraints: $u_{min} \leq u \leq u_{max}$ and $x_{min} \leq x \leq x_{max}$.

According to the invention, a control value is determined for the force exerted by the converter machine on the mobile device maximizing the average power generated by the converter machine, by carrying out the following steps:

i) determining an objective function representative of the power generated by the converter machine by use of the prediction of the force exerted by the waves on the mobile device, of the dynamic model and of the energy model;

ii) discretizing the objective function using the trapezoidal rule;

iii) weighting, in the objective function, the future values of the instantaneous power generated using weighting coefficients; and iv) deducing the control value of the force exerted by the converter machine on the mobile device by minimizing the discretized and weighted objective function.

i) Determining the Objective Function

In this step, an objective function representative of the power generated by the converter machine is determined. The objective function is then minimized (Step iv), to maximize the power recovered by the wave energy system. The objective function is determined by applying the energy model and the dynamic model to the prediction of the force exerted by the waves.

More precisely, minimization of the objective function to be solved at time t, with the prediction horizon $T_p$, can be formulated as follows:

$$\min_{u} \int_{t}^{t+T_p} -\eta u_a(t)v(t)dt$$

$$\begin{cases} u_{min} \leq u \leq u_{min} \\ x_{min} \leq x \leq x_{min} \end{cases}$$

The quantity $u_a(t)$ is obtained by the dynamic model by use of the wave force prediction.

It can be noted that the sign is changed in the integral to able setting an equivalent minimization problem.

ii) Discretizing the Objective Function

Figure 4A:
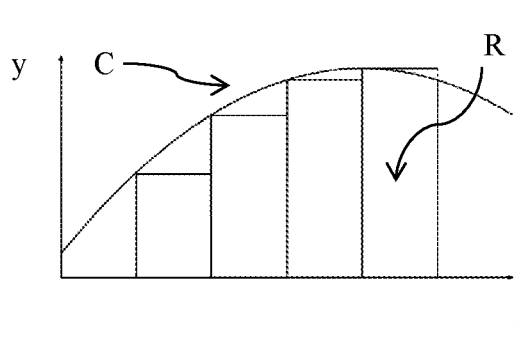
FIG. 4a illustrates a discretization of a function according to the rectangle method.
Figure 4B:
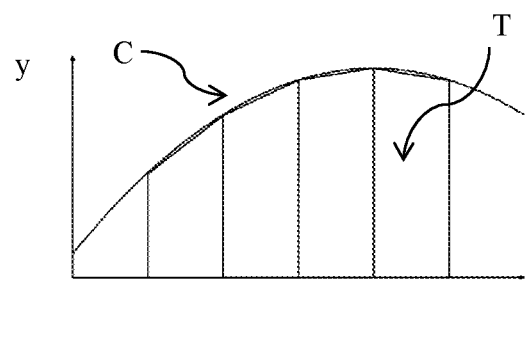
FIG. 4b illustrates a discretization of the same function according to the trapezoidal rule.

In this step, the objective function is discretized in order to be able to readily solve the minimization problem. According to the invention, this discretization is implemented using the trapezoidal rule. The trapezoidal rule is a method for numerical calculation of an integral based on a linear interpolation in intervals. The principle approximates the region under the curve representative of a function as a trapezoid and in calculating the area thereof. The trapezoidal rule enables better approximation of the objective function (more accurate) than the rectangle method used in the prior art. This higher accuracy is illustrated in FIGS. 4a and 4b. FIG. 4a illustrates, in a reference frame (x, y), the approximation of a curve C by the rectangle method R. FIG. 4b illustrates, in a reference frame (x, y), the approximation of a curve C by the trapezoidal rule T. It can be seen in these figures that curve C is approximated more accurately by the trapezoids than by the rectangles.

The trapezoidal rule is applied to involve a second time control $u_a$ in the objective function, by adding to the term given by the control at time k+j multiplied by the velocity at time k+j a new term given by the control at time k+j multiplied by the velocity at time k+j+1. This additional term allows the objective function to be made convex.

According to an embodiment of the invention, the continuous model of the wave energy system is written:

$$\begin{cases} \dot{x}(t) = A_c x(t) + B_{cu} u(t) + B_{cw} w(t) \\ y(t) = C_c x(t) \end{cases}$$

This model can be discretized with Tustin's method, with a given sampling period:

$$\begin{cases} x(k+1) = Ax(k) + B_u u(k) + B_w w(k) \\ y(k) = Cx(k) + D_u u(k) + D_w w(k) \end{cases}$$

where A, B, $B_u$, $B_w$, C, $D_u$, and $D_w$ are the matrices obtained with the continuous-time system discretization.

Concerning the integral criterion to be minimized, in the methods provided to date for wave energy systems, discretization is performed using the rectangle method, which yields:

$$\min_{u(k|k),u(k+1|k),\ldots,u(k+N_p-1|k)} \sum_{j=0}^{N_p-1} -\eta(k+j|k) u_a(k+j|k) v(k+j|k)$$

such that $\begin{cases} u_{min} \leq u(k+j|k) \leq u_{min}, j=0,1,\ldots,N_p-1 \\ x_{min} \leq x(k+j|k) \leq x_{min}, j=0,1,\ldots,N_p-1 \end{cases}$ where $N_P$ is the number of discrete time steps contained in the prediction horizon (such that $T_p = N_p h$, where his the sampling period), where u(k+j|k), $u_a$(k+j|k), v(k+j|k) and η(k+j|k) respectively represent the predicted control, the predicted converter machine output, the predicted float velocity and the predicted efficiency at time k+j from the information available at time k.

Figure 9:
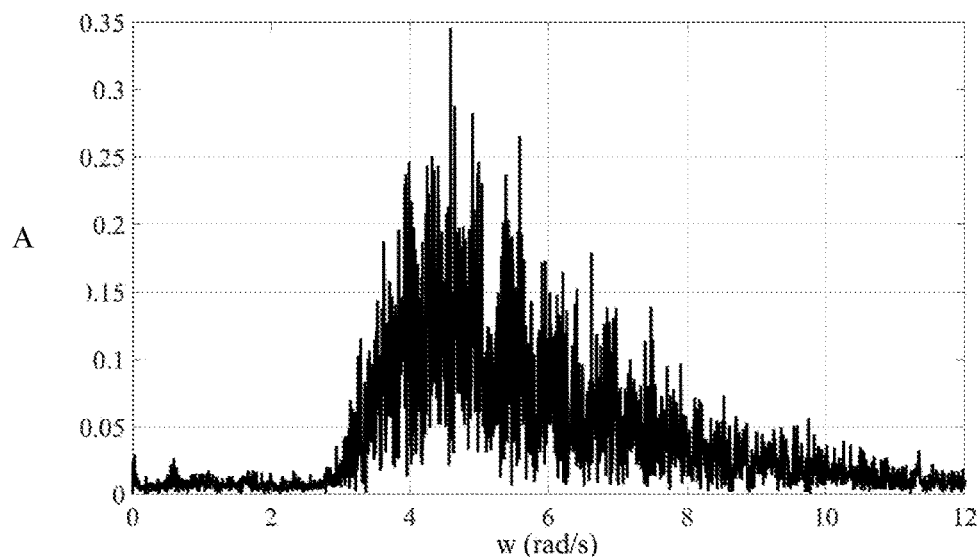
FIG. 9 illustrates, for the first example, the spectral density of the waves.

This discretization approach is the one followed for the control strategy described in French patent application FR-3, 019,235 (WO-2015/150,102). It is also encountered in the prior art for the more simple and less realistic case η=1 (and without actuator dynamics). The resulting objective function is not convex, even for η=1, which makes the optimization problem difficult to solve effectively online. In the case of η=1 and $u_a$(t)=u(t), α convexification of the proposed objective function, based on the addition of a penalty to the control, could be considered. However, it can be shown that this modification leads to a widely suboptimal solution, with a significant recovered energy loss, even in the more simple case considered (see FIG. 9 described in detail at the end of the description).

According to an embodiment of the invention, it is assumed that the variation rate of v(t) is much higher than that of $u_a$(t). This assumption is reasonable, because $u_a$(t) is the output of a dynamic system whose input u(t) is kept constant between each sampling period.

By advantageously applying the trapezoidal rule, the discretized objective function to be minimized can be written:

$$\min_{u(k|k),u(k+1|k),\ldots,u(k+N_p-1|k)} \sum_{j=0}^{N_p-2} -\eta(k+j|k)$$

$$u_a(k+j|k)(v(k+j|k)+v(k+j+1|k))$$

such that $\begin{cases} u_{min} \leq u(k+j|k) \leq u_{min}, j=0,1,\ldots,N_p-1 \\ x_{min} \leq x(k+j|k) \leq x_{min}, j=0,1,\ldots,N_p-1 \end{cases}$ It should be noted that using the trapezoidal rule allows involving in the objective function the average between two successive values (at steps k+j and k+j+1) of velocity v, and therefore of the predicted extracted power. The factor two that should be in the denominator to work out the average can be removed from the objective function because it has no influence on the optimal solution. It is the presence of the additional term $u_a$(k+j|k)v(k+j+1|k) that allows the objective function to be made convex.

iii) Weighting the Objective Function

In order to make the minimization problem convex, so as to make control determination fast and possible in real time, weights are introduced in the discretized objective function. The purpose is to weight the predicted future values of the extracted power by use of weighting coefficients. Thus, for an optimized control, greater importance can be given to the close future predictions (by applying relatively small weights) and lesser importance can be given to the distant future predictions (by applying relatively great weights).

According to an embodiment of the invention, by denoting by $q_j$ which is the weighting coefficient for step j of the prediction horizon, the new discretized and weighted objective function can then be introduced which is:

$$J = \sum_{j=0}^{N_p-2} q_j u_a(k+j|k)(v(k+j|k)+v(k+j+1|k))$$

in the control problem:

$$\min_{u(k|k),u(k+1|k),\ldots,u(k+N_p-1|k)} J$$

such that $\begin{cases} u_{min} \leq u(k+j|k) \leq u_{min}, j=0,1,\ldots,N_p-1 \\ x_{min} \leq x(k+j|k) \leq x_{min}, j=0,1,\ldots,N_p-1 \end{cases}$ where $q_j \leq 0$ (j=1, 2, ..., $N_p$−2) are adjustment parameters to be selected, allowing differently weighting $u_a$(k+j|k)(v(k+j|k)+v(k+j+1|k)), which is the prediction of the recovered power at time k+j.

In this formulation, efficiency η is taken into account in weighting coefficients $q_0, q_1, \ldots q_{N_p-2}$.

According to an embodiment, it is possible to select weights that increase over time, that is:

$q_0 \leq q_1 \leq \ldots \leq q_{N_p-2}$

Thus, the recovered energy predictions in the most distant future will have less and less impact in criterion J. This is very reasonable insofar as the predictions of velocity v(k+j|k) are calculated from the predictions of the wave force, v(k+j|k), which are less and less accurate when moving forward in line into the prediction horizon. Thus, it is decided to have less confidence in the more distant and less accurate predictions, which is beneficial to the control law robustness.

Besides, the first weight can be selected much smaller than all the others, that is:

$q_0 << q_j$, j=1,2,...,$N_p$−2.

Thus, the optimal solution tends towards $u_a$(k|k)v(k|k)≥0, that is $u_a$(k|k) and v(k|k) have the same sign. In other words, the control law obtained by this variant embodiment allows avoiding the use of reactive power (from the grid).

Once the new formulation of the objective function introduced, using standard mathematical passages for the control with a model predictive control (MPC) approach with moving horizon, it is possible to rewrite it in compact matrix form as shown hereafter.

Using the equation of state (the first equation) of the system model:

$$\begin{cases} x(k+1) = Ax(k) + B_u u(k) + B_w w(k) \\ y(k) = Cx(k) + D_u u(k) + D_w w(k) \end{cases}$$

the predicted states x(k+j|k) can be expressed sequentially, depending on the current state of the system x(k|k)=x(k), all of the predicted controls u(k+j|k) and all of the predicted wave excitation forces w(k+j|k), for j=1, 2, ... $N_{p-1}$.

$$\begin{cases} x(k+1|k) = Ax(k|k) + B_u u(k|k) + B_w w(k|k) \\ x(k+2|k) = Ax(k+1|k) + B_u u(k+1|k) + B_w w(k+1|k) \\ \quad = A^2 x(k|k) + AB_u u(k|k) + B_u u(k+1|k) + AB_w w(k|k) + B_w w(k+1|k) \\ \vdots \\ x(k+N_p-1|k) = A^{N_p-1} x(k|k) + A^{N_p-2} B_u u(k|k) + B_u u(k+N_p-1|k) + \\ \quad + A^{N_p-2} B_w w(k|k) + B_w w(k+N_p-1|k) \end{cases}$$

Which can also be written in matrix form as follows:

$$x_e = A_e x(k|k) + B_{ue} u_e + B_{we} w_e$$

where $$x_e = \begin{bmatrix} x(k|k) \\ x(k|+1k) \\ \vdots \\ x(k+N_p-1|k) \end{bmatrix}, u_e = \begin{bmatrix} u(k|k) \\ u(k|+1k) \\ \vdots \\ u(k+N_p-1|k) \end{bmatrix},$$

$$w_e = \begin{bmatrix} w(k|k) \\ w(k|+1k) \\ \vdots \\ w(k+N_p-1|k) \end{bmatrix}$$

$$A_e = \begin{bmatrix} I \\ A \\ A^2 \\ \vdots \\ A^{N_p-1} \end{bmatrix},$$

$$B_{ue} = \begin{bmatrix} 0 & 0 & 0 & \cdots & 0 & 0 \\ B_u & 0 & 0 & \cdots & 0 & 0 \\ AB_u & B_u & 0 & \cdots & 0 & 0 \\ \vdots & \vdots & \vdots & \ddots & \vdots & \vdots \\ A^{N_p-2}B_u & A^{N_p-3}B_u & A^{N_p-4}B_u & \cdots & B_u & 0 \end{bmatrix} \text{ and}$$

$$B_{we} = \begin{bmatrix} 0 & 0 & 0 & \cdots & 0 & 0 \\ B_w & 0 & 0 & \cdots & 0 & 0 \\ AB_w & B_w & 0 & \cdots & 0 & 0 \\ \vdots & \vdots & \vdots & \ddots & \vdots & \vdots \\ A^{N_p-2}B_w & A^{N_p-3}B_w & A^{N_p-4}B_w & \cdots & B_w & 0 \end{bmatrix}$$

Similarly, using the output equation (the first equation) of the system model, it is obtained:

$$\begin{cases} y(k|k) = Cx(k|k) + D_u u(k|k) + D_w w(k|k) \\ y(k+1|k) = Cx(k+1|k) + D_u u(k+1|k) + D_w w(k+1|k) \\ \vdots \\ y(k+N_p-1|k) \quad Cx(kk+N_p-1|k) + \\ \quad D_u u(k+N_p-1|k) + D_w w(k+N_p-1|k) \end{cases}$$

which can be rewritten in matrix form:

$$y_e = C_e x_e + D_{ue} u_e + D_{we} w_e$$

where $y_e = \begin{bmatrix} y(k|k) \\ y(k|+1k) \\ \vdots \\ y(k+N_p-1|k) \end{bmatrix}, C_e = \begin{bmatrix} C & 0 & \cdots & 0 \\ 0 & C & \cdots & 0 \\ \vdots & \vdots & \ddots & \vdots \\ 0 & 0 & \cdots & C \end{bmatrix}$ and $$D_{ue} = \begin{bmatrix} D_u & 0 & \cdots & 0 \\ 0 & D_u & \cdots & 0 \\ \vdots & \vdots & \ddots & \vdots \\ 0 & 0 & \cdots & D_u \end{bmatrix}, D_{we} = \begin{bmatrix} D_w & 0 & \cdots & 0 \\ 0 & D_w & \cdots & 0 \\ \vdots & \vdots & \ddots & \vdots \\ 0 & 0 & \cdots & D_w \end{bmatrix}$$

By inserting the matrix equation that defines $x_e$ into the one that defines $y_e$, the relationship is obtained:

$$y_e = C_e A_e x(k|k) + (C_e B_{ue} + D_{ue}) u_e + (C_e B_{we} + D_{we}) w_e$$

or, in an equivalent manner:

$$y_e = \Phi x(k|k) + \Psi_u u_e + \Psi_w w_e$$

where $\Phi = C_e A_e$, $\Psi_u = C_e B_{ue} + D_{ue}$, $\Psi_w = C_e B_{we} + D_{we}$ The objective function $$J = \sum_{j=0}^{N_p-1} q_j u_a(k+j|k)(v(k+j|k) + v(k+j+1|k))$$

can also be put in matrix form as follows:

$$J = u_a^T Q(v_1 + v_2)$$

where Q is a diagonal matrix containing the weights $$Q = \mathrm{diag}(\begin{bmatrix} q_0 & q_1 & \cdots & q_{N_p-2} \end{bmatrix}) \text{ and}$$

$$u_a = \begin{bmatrix} u_a(k|k) \\ u_a(k+1|k) \\ \vdots \\ u_a(k+N_p-2|k) \end{bmatrix}, v_1 = \begin{bmatrix} v(k|k) \\ v(k+1|k) \\ \vdots \\ v(k+N_p-2|k) \end{bmatrix},$$

-continued $$v_2 = \begin{bmatrix} v(k+1|k) \\ v(k+2|k) \\ \vdots \\ v(k+N_p-1|k) \end{bmatrix}$$

By using $$y(k+j|k) = \begin{bmatrix} v(k+j|k) \\ u_a(k+1|k) \end{bmatrix}, J = 1, 2, \ldots, N_p - 2$$

Thus: $u_a = T_a y_e$, $v_1 = T_1 y_e$, $v_2 = T_2 y_e$, where $T_a = \begin{bmatrix} 0 & 1 & 0 & 0 & 1 & 0 & 0 \\ 0 & 0 & 0 & 1 & \cdots & 0 & 0 \\ \vdots & \vdots & \vdots & \vdots & \ddots & \vdots & \vdots \\ 0 & 0 & 0 & 0 & \cdots & 0 & 1 \end{bmatrix}$, $T_1 = \begin{bmatrix} 1 & 0 & 0 & 0 & 0 & 0 & 0 \\ 0 & 0 & 1 & 0 & \cdots & 0 & 0 \\ \vdots & \vdots & \vdots & \vdots & \ddots & \vdots & \vdots \\ 0 & 0 & 0 & 0 & \cdots & 1 & 0 \end{bmatrix}$, $T_2 = \begin{bmatrix} 0 & 0 & 1 & 0 & 0 & 0 & 0 \\ 0 & 0 & 0 & 0 & \cdots & 0 & 0 \\ \vdots & \vdots & \vdots & \vdots & \ddots & \vdots & \vdots \\ 0 & 0 & 0 & 0 & \cdots & 1 & 0 \end{bmatrix}$ which yields, by replacing in the expression of J:

$$J = y_e^T T_a^T Q(T_1 + T_2) y_e$$

That is $Q = T_a^T(T_1 + T_2)$.

Using the expression of $y_e$, J becomes:

$$J = (\Phi x(k|k) + \Psi_u u_e + \Psi_w w_e)^T Q(\Phi x(k|k) + \Psi_u u_e + \Psi_w w_e)$$

or, in a equivalent manner, $$J = u_e^T \Psi_u^T Q \Psi_u u_e + 2 u_e^T \Psi_u^T Q [\Phi \quad \Psi_w]\begin{bmatrix} x(k|k) \\ w_e \end{bmatrix} + (\Phi x(k|k) + \Psi_w w_e)^T Q(\Phi x(k|k) + \Psi_w w_e)$$

The final term $(\Phi x(k|k) + \Psi_w w_e)^T Q(\Phi x(k|k) + \Psi_w w_e)$ can be eliminated from J, because it does not influence the optimal solution (it does not depend on $u_e$).

As a result, the objective function can be written in a simplified manner:

$$J' = u_e^T \Psi_u^T Q \Psi_u u_e + 2 u_e^T \Psi_u^T Q [\Phi \quad \Psi_w]\begin{bmatrix} x(k|k) \\ w_e \end{bmatrix}$$

or in an equivalent manner $$J' = u_e^T H u_e + 2 u_e^T f \begin{bmatrix} x(k|k) \\ w_e \end{bmatrix}$$

with $$H = \Psi_u^T Q \Psi_u, \; f = \Psi_u^T Q[\Psi \Psi_w]$$

To complete the reformulation of the MPC control problem in matrix form, the constraints on the control $$u_{min} \leq u(k+j|k) \leq u_{min}, j=0,1,\ldots,N_p-1$$

are expressed in terms of constraints on $u_e$. Let 1 be a vector of 1 of suitable length, the set of constraints is then:

$$1 u_{min} \leq u_e \leq 1 u_{max}$$

The constraints on the state can be treated in a similar manner.

According to an embodiment of the invention, the weighted and discretized objective function can finally be written in matrix form:

$$\min_{u_e} \left\{ u_e^T H u_e + 2 u_e^T f \begin{bmatrix} x(k|k) \\ w_e \end{bmatrix} \right\},$$

such that $1 u_{min} \leq u_e \leq 1 u_{max}$
if the constraints on the state are not considered, for simplicity.

According to an embodiment of the invention, weighting coefficients $q_j$, $j=1, 2, \ldots, N_p-2$ can be determined offline and prior to the steps of the control method. With the MPC problem, it was assumed that weights $q_0, q_1, \ldots, q_{N_p-2}$ had already been selected. Indeed, prior to applying the MPC control online, it is possible to go through an offline optimization step allowing them to be selected so that the online solution of the MPC problem maximizes the energy extracted by the wave energy system.

In other words, the best set of parameters needs to be found, $$q = [q_0 q_1 \ldots q_{N_p-2}]^T,$$

that is maximizing the extracted average power $P_a$ $$P_a = \frac{1}{T} \int_{t=0}^{T} \eta u_a(t) v(t) dt$$

or, in an equivalent manner, $$\min_q \{-P_a\}.$$

It is noted that it is an optimization problem that is difficult to solve because power $P_a$ depends on control u(t), which in turn is calculated online by solving the MPC problem as follows:

$$\min_{u_e} \left\{ u_e^T H_m u_e + 2 u_e^T f \begin{bmatrix} x(k|k) \\ w_e \end{bmatrix} \right\},$$

such that $1 u_{min} \leq u_e \leq 1 u_{max}$

Thus, $P_a$ is finally a function of parameters $q_j$, $j=1, 2, \ldots, N_p-2$ that needs to be optimized (to maximize $P_a$). The solution of this optimization problem can involve algorithms such as genetic algorithms, or particle swarm optimization, variable neighborhood search, or the Nelder-Mead method.

Average power $P_a$ is not only a function of q, but also of wave force predictions $w_e$. The step of optimizing q can therefore be carried out on wave force time series w(t)

generated from a set of sea state spectra covering the expected operating conditions of the wave energy system.

With $n_l$ being the number of sea states considered, the objective function to be optimized is then $$\min_q \left\{ -\sum_{l=1}^{n_l} P_{a,l} \right\}$$

where each $P_{a,l}$ is calculated, for the current q, by simulating the model of the wave energy system $$\begin{cases} x(k+1) = Ax(k) + B_u u(k) + B_w w(k) \\ y(k) = Cx(k) + D_u u(k) + D_w w(k) \end{cases}$$

with, at the input, the time series w(k) corresponding to sea state l, and control u(k) calculated in closed loop with the MPC control law $$\min_{u_e} \left\{ u_e^T H_m u_e + 2u_e^T f \begin{bmatrix} x(k|k) \\ w_e \end{bmatrix} \right\},$$

such that $1u_{min} \leq u_e \leq 1u_{max}$
obtained with the current q.

The initial value of q can be selected for example as follows:

$$q_0 = q_1 = \ldots = q_{N_p-2} = -1$$

It can be noted that, although this optimization step is very demanding in terms of calculations, it is carried out offline, once and for all, without any particular computation time constraints.

iv) Determining the Control Value

In this step, the control value of the force exerted by the converter machine on the mobile device is determined by minimizing the discretized and weighted objective function. This determination involves a model predictive control (MPC) approach with moving horizon. Thus, in this step, the optimal control $u_e$ is determined in discretized, weighted and matrix form, such that:

$$\min_{u_e} \left\{ u_e^T H u_e + 2u_e^T f \begin{bmatrix} x(k|k) \\ w_e \end{bmatrix} \right\},$$

such that $1u_{min} \leq u_e \leq 1u_{max}$

According to an embodiment based on the moving horizon principle, the optimal solution of the optimization problem, it is determined:

$$u^*_e = [u^*(k|k) u^*(k+1|k) \ldots u^*(k+N_p-1|k)]$$

but only the first value of sequence $u^*(k|k)$ is applied to the system as control of the force of the converter machine, that is:

$$u(k) = u^*(k|k)$$

As formulated for a given set of weighting parameters $q_j$, j=1, 2, ..., $N_p$−2, the above optimization problem is a quadratic programming (QP) problem.

According to a first implementation of the invention, if $u_a(t) = u(t)$, that is if the dynamics of the actuator are not included in the MPC design model, the optimization problem is also convex, and it can therefore be solved effectively (rapidly) online with standard QP solvers (quadratic programming solvers). It is an important result because, in many cases, the dynamics of the converter machine of the wave energy system is much faster than that of the wave energy system (float+mobile parts) and it can therefore be disregarded. The control method according to the invention thus allows these cases to be effectively addressed, without any subsequent steps.

According to a second implementation of the invention, if the dynamics of the converter machine cannot be disregarded and is therefore included in the model for the synthesis of the MPC control, the above optimization problem is no longer convex, since there is no guarantee that the quadratic weighting matrix H is positive definite (a sufficient mathematical condition for the problem to be strictly convex). A subsequent step can thus be used to convexify it, with less optimality losses. In order to make the optimization problem convex, the negative or zero eigenvalues of weighting matrix H can be replaced by positive values, which preferably are very small positive values (ranging between 0.0001 and 0.1 for example). Thus, the optimization problem can be solved effectively by standard QP solvers.

According to an example of this implementation, the problem is convexified using the Jordan decomposition $H = S\Lambda S^{-1}$
where S is a nonsingular matrix and $$\Lambda = \text{diag}([\lambda_0 \ldots \lambda_{v-1} \lambda_v \ldots \lambda_{N_p-1}])$$

is a diagonal matrix containing the eigenvalues of H (which are real numbers because H is symmetric), in ascending order:

$$\lambda_0 \leq \lambda_1 \leq \ldots \leq \lambda_{v-1} \leq 0 < \lambda_v \leq \ldots \leq \lambda_{N_p-1}$$

V is the number of eigenvalues less than or equal to zero.
The diagonal matrix is considered as follows:

$$\Lambda_m = \text{diag}([\in \ldots \in \lambda_v \ldots \lambda_{N_p-1}])$$

where the eigenvalues of Λ less than or equal to zero have been replaced by a very small positive real number (∈=0.001 for example).

$H_m$ is designed as $$H_m = S\Lambda_m S^{-1}.$$

Since its eigenvalues are all strictly positive, $H_m$ is a positive definite matrix. If we replace H by $H_m$ in the cost function of the MPC problem, the relationship is obtained:

$$\min_{u_e} \left\{ u_e^T H_m u_e + 2u_e^T f \begin{bmatrix} x(k|k) \\ w_e \end{bmatrix} \right\},$$

such that $1u_{min} \leq u_e \leq 1u_{max}$.

Thus, the problem becomes strictly convex. It can therefore be readily solved with standard quadratic programming solvers.

The new quadratic weighting matrix $H_m$ is an approximation of H, and therefore the optimal solution of the modified problem can be suboptimal in relation to the initial problem. However, the optimality loss is much less significant than in the case of a convexification through addition of weights to the controls.

As set, the model predictive control (MPC) problem with a moving horizon obtained with the method according to the invention can be readily solved with standard quadratic programming QP solvers, much more rapidly than a MPC control problem with a non-convex objective function. This allows the control method to be implemented online and in real time, even with fast-dynamics wave energy systems.

Step 6—Control of the Converter Machine

In this step, the converter machine is controlled as a function of the value determined in the previous step. The converter machine (electrical or hydraulic machine) is therefore actuated to reproduce the new value of force u as determined in step 5.

For example, the new expression of force u allows obtaining a force $u_a$ exerted by the converter machine on the mobile device which is applied to the control system of the electrical machine. Controlling the electrical machine so that it applies force $u_a$ corresponding, up to the dynamics of the machine, to the requested control u is achieved by modifying the electrical current applied to the electrical machine. More precisely, to provide a torque or a force that drives the mobile device, a current is applied by supplying electrical power. On the other hand, to produce a torque or a force withstanding the motion of the mobile device, a current is applied by recovering an electrical power.

Figure 3:
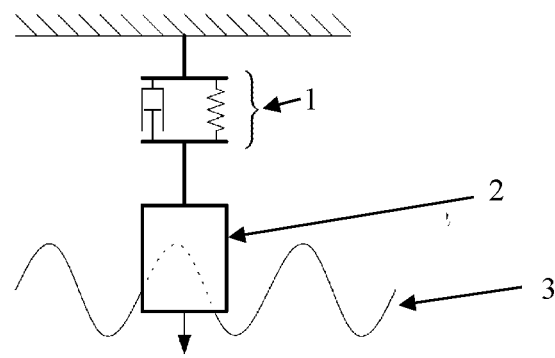
FIG. 3 illustrates an example of a wave energy system.
Figure 11:
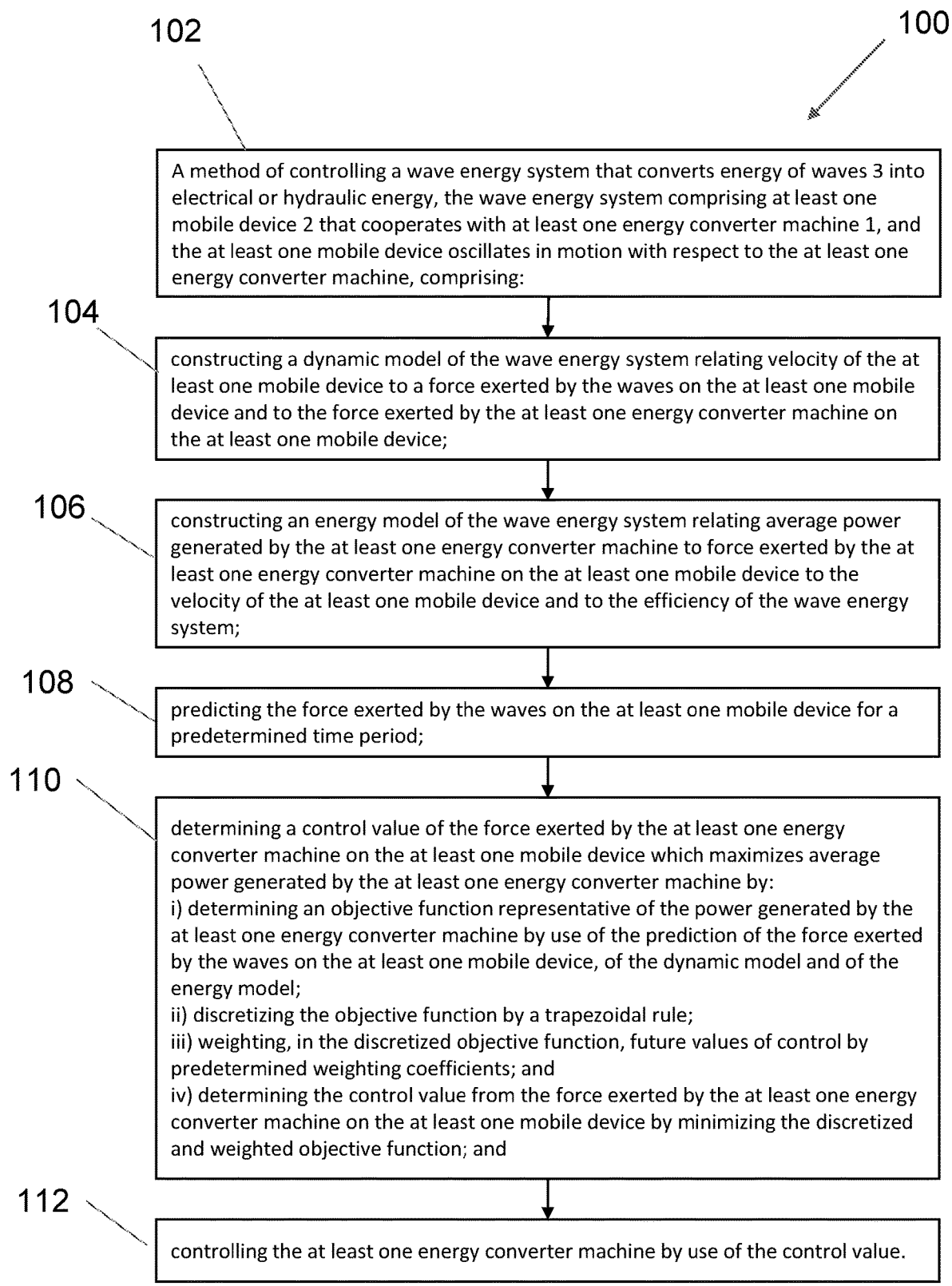
FIG. 11 illustrates a flow chart of a method of controlling a wave energy system in accordance with the invention.

FIG. 11 is a flow chart of the method 100 in accordance with the invention. The method involves control 102 of a wave energy system such as shown in FIG. 3 that converts energy of waves 3 into electrical or hydraulic energy with the wave energy system comprising at least one mobile device 2 that cooperates with at least one energy converter machine 1, and the at least one mobile device oscillates in motion as shown with respect to the at least one energy converter machine. The method 100 proceeds to step 104 which constructs a dynamic model of the wave energy system relating velocity of the at least one mobile device to a force exerted by the waves on the at least one mobile device and to the force exerted by the waves on the at least one mobile device exerted by the at least one energy converter on the at least one mobile device. The method 100 proceeds to step 106 which constructs an energy model of the wave energy system relating the average power generated by the at least one energy converter machine to a force exerted by the at least one energy machine on the at least one mobile device to the velocity of the at least one mobile device and to efficiency of the wave energy system. The method 100 proceeds to step 108 which predicts the force exerted by the waves on the at least one mobile device for a predetermined time. The method then proceeds to step 110 that determines a control value of the force exerted by the at least one energy converter machine which maximizes average power generated by the at least one energy converter machine The method by i) determining an objective function representative of the power generated by the at least one energy converter machine by use of the prediction of the force exerted by the waves on the at least one mobile device of the dynamic model; ii) discretizing the objective function by a trapezoid rule; iii) weighting, in the discretized objective function, future values of control by predetermined weighting coefficients; and iv) determining the control value from the force exerted by the at least one energy converter machine on the at least one mobile device by minimizing the discretized weighted objective function. The method 100 then proceeds to step 114 that controls the at least one energy converter machine by use of the control value.

Application Example

A non-limiting example of a wave energy system is an oscillating buoy as shown in FIG. 3. This wave energy system comprises a buoy 2 as the mobile device of mass m, a converter machine 1 of damping d and elasticity k that is stationary. The buoy is subjected to an oscillating motion through waves 3 and to hydraulic forces.

The control method according to the invention is compared with the control method described in French patent application FR-2,973,448 (WO-2012/131,186), by studying the responses obtained with these two methods. This comparative example was implemented on a wave energy system corresponding to the diagram of FIG. 3. FIGS. 5 to 8 are curves of the values obtained with the two methods. For this example, the spectral density of the waves being considered is in accordance with the curve in FIG. 9 of amplitude A as a function of frequency w (rad/s). In curves 5 to 8, the results obtained by the control method according to the invention are denoted by INV and the results obtained by the control method described in French patent application FR-2,973,448 (WO-2012/131,186) are denoted by AA.

Figure 5:
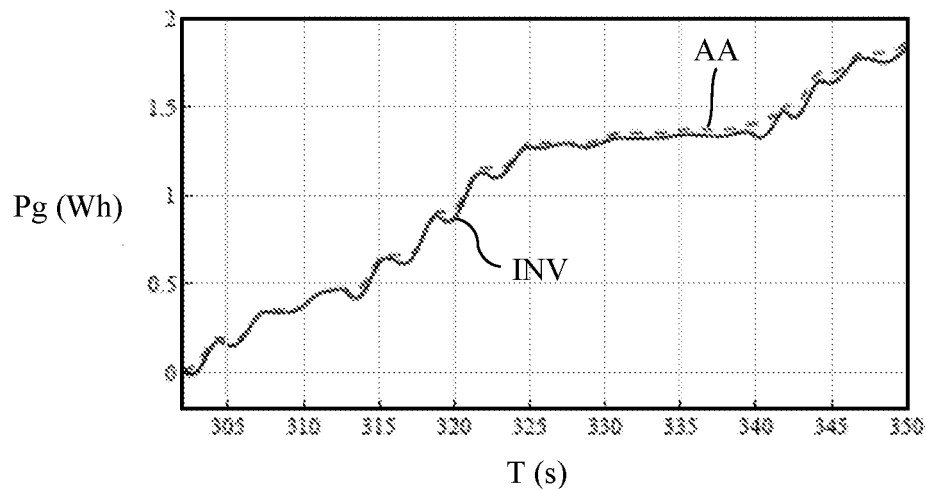
FIG. 5 illustrates, for a first example, a curve of the power generated by a wave energy system obtained by a control method according to the prior art and by the control method according to an embodiment of the invention.

FIG. 5 illustrates the generated power Pg (Wh) as a function of time T (s). It is noted that generated power Pg is substantially identical for both control methods.

Figure 6:
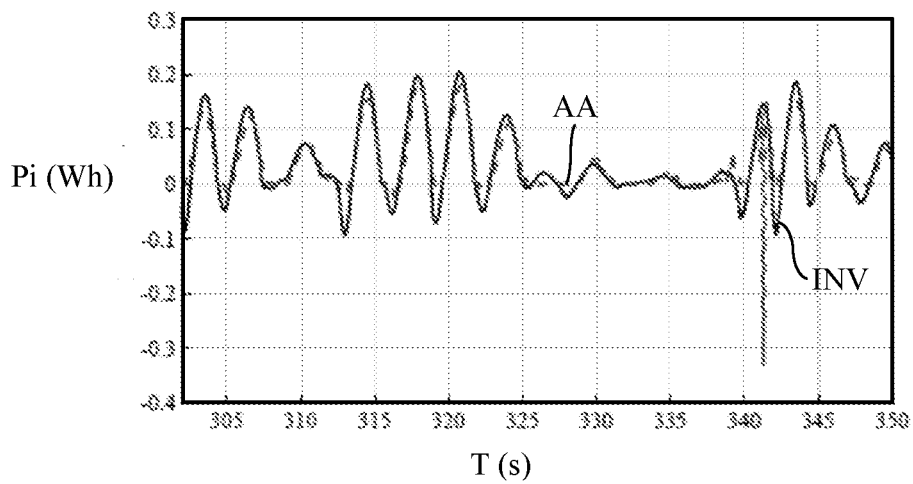
FIG. 6 illustrates, for the first example, a curve of the instantaneous power generated by a wave energy system obtained by a control method according to the prior art and by the control method according to an embodiment of the invention.

FIG. 6 illustrates the instantaneous power Pi (Wh) as a function of time T (s). It is noted that the two control methods yield similar results in terms of instantaneous power.

Figure 7:
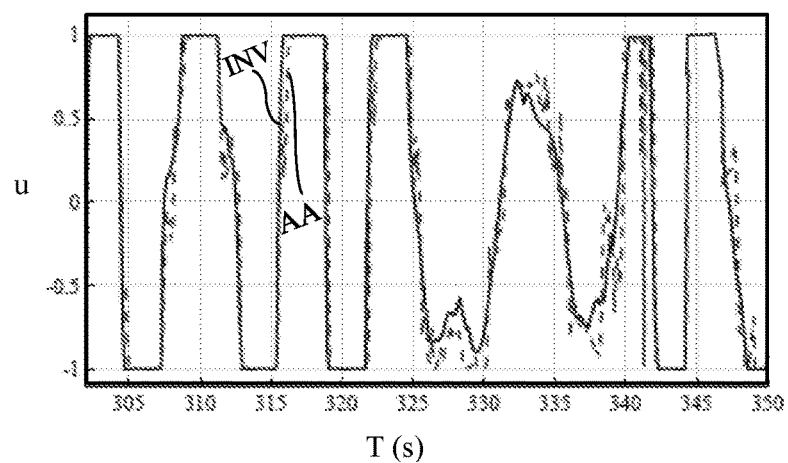
FIG. 7 illustrates, for the first example, a curve of the control for a wave energy system obtained by a control method according to the prior art and by the control method according to an embodiment of the invention.

FIG. 7 illustrates the control u of the converter machine as a function of time T (s). A good match of the two controls determined is noted.

Figure 8:
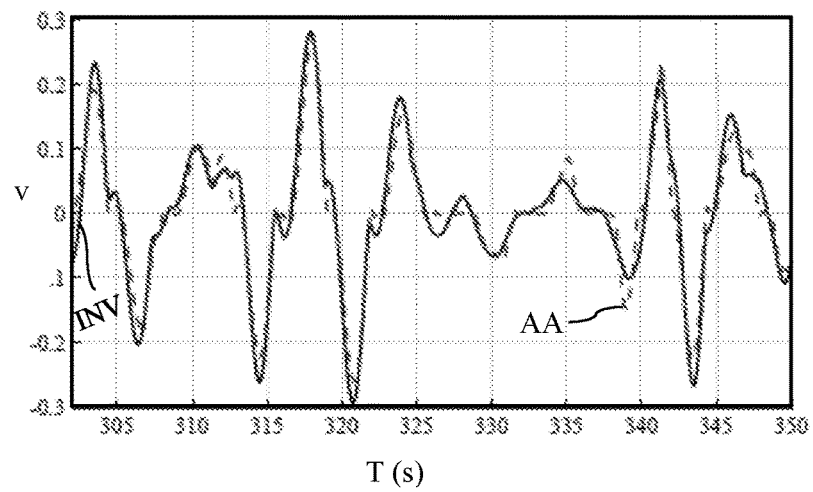
FIG. 8 illustrates, for the first example, a curve of the average velocity of the mobile device of a wave energy system obtained by a control method according to the prior art and by the control method according to an embodiment of the invention.

FIG. 8 illustrates velocity v of the mobile device as a function of time T (s). A good match of the velocities determined is also noted.

Thus, the method according to the invention provides optimal control in terms of energy recovery.

Furthermore, the computation time required for the method according to the invention is of the order of one microsecond with a standard prototype calculator, whereas the computation time required for the method described in patent application FR-2,973,448 (WO-2012/131,186) is of the order of a hundred milliseconds for the same calculator. Thus, the method according to the invention is more favorable to a real-time use.

Figure 10:
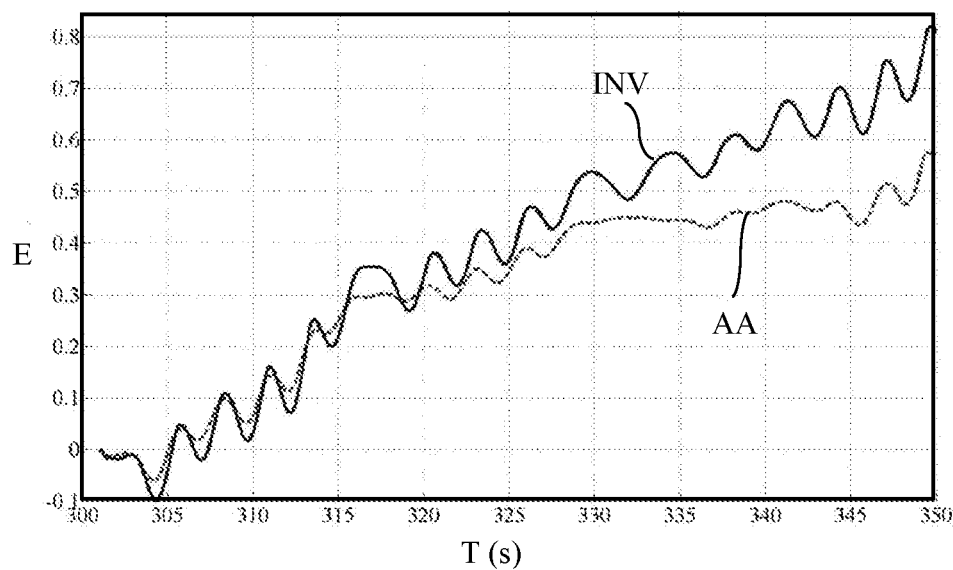
FIG. 10 illustrates, for a second example, a curve of the energy generated by a wave energy system obtained by a control method according to the prior art and by the control method according to an embodiment of the invention.

For the control method described in French patent application FR-2,973,448 (WO-2012/131,186), consideration could be given to convexifying the objective function by addition of a penalty to the control. By use of a second comparative example, it can also be shown that, when trying to convexify the objective function by discretization with the rectangle method, by adding the smallest weight to the control that makes the system convex, much less energy is recovered than with the convexification by discretization with the trapezoidal rule (method presented here, case $u_a(t)=u(t)$). FIG. 10 illustrates the energy E generated by the mobile device as a function of time. Curve INV corresponds to the discretization with the trapezoidal rule that involves a second time the control in the objective function at each step of the prediction horizon according to the invention, and curve AA corresponds to the convexification of the objective function by adding a small weight to the control.

Thus, using the trapezoidal rule for discretization, coupled with the use of weights on the predicted extracted power values, allows obtaining an optimal control in terms of generated energy.

The invention claimed is:

1. A method of controlling a wave energy system that converts energy of waves into electrical or hydraulic energy, the wave energy system comprising at least one mobile device that cooperates with at least one energy converter machine, and the at least one mobile device oscillates in motion with respect to the at least one energy converter machine, comprising:

a) constructing a dynamic model of the wave energy system relating velocity of the at least one mobile device to a force exerted by the waves on the at least one mobile device and to the force exerted by the at least one energy converter machine on the at least one mobile device;

b) constructing an energy model of the wave energy system relating average power generated by the at least one energy converter machine to force exerted by the at least one energy converter machine on the at least one mobile device to the velocity of the at least one mobile device and to the efficiency of the wave energy system;

c) predicting the force exerted by the waves on the at least one mobile device for a predetermined time period;

d) determining a control value of the force exerted by the at least one energy converter machine on the at least one mobile device which maximizes average power generated by the at least one energy converter machine by:

i) determining an objective function representative of the power generated by the at least one energy converter machine by use of the prediction of the force exerted by the waves on the at least one mobile device, of the dynamic model and of the energy model;

ii) discretizing the objective function by a trapezoidal rule; and iii) weighting, in the discretized objective function, future values of control by predetermined weighting coefficients;

iv) determining the control value from the force exerted by the at least one energy converter machine on the at least one mobile device by minimizing the discretized and weighted objective function; and e) controlling the at least one energy converter machine by use of the control value.

2. A method as claimed in claim 1, wherein the discretized and weighted objective function J is expressed by a relationship: $J=\sum_{j=0}^{N_p-2} q_j u_a(k+j|k)(v(k+j|k)+v(k+j+1|k))$, with $q_j$ being the weighting coefficients, $u_a$ being the force exerted by the at least one energy converter machine on the at least one mobile device, v being the velocity of the at least one mobile device and Np being a number of time steps contained in a prediction horizon and k and j being time steps.

3. A method as claimed in claim 2, wherein the discretized and weighted objective function J is written in matrix form as:

$$J = u_e^T H u_e + 2u_e^T f \begin{bmatrix} x(k|k) \\ w_e \end{bmatrix},$$

with $u_e$ being a vector of the force exerted by the at least one energy converter machine on the at least one mobile device, x being the state vector of a model of the wave energy system with the at least one energy converter machine, $w_e$ being the vector of the wave force predictions, H being a weighting matrix on vector $u_e$, f being a weighting matrix n on the current state x of a global dynamic model of the wave energy system and the vector of the wave force predictions $w_e$ and T is duration.

4. A method as claimed in claim 3, wherein negative or zero eigenvalues of the weighting matrix H are replaced by positive eigenvalues.

5. A method as claimed in claim 1, wherein force exerted by the waves on the at least one mobile device is predicted by at least one of measurement or estimation of the force exerted by the waves on the at least one mobile device, by using pressure detectors adjacent the at least one mobile device or force sensors between the at least one mobile device and the at least one energy converter machine.

6. A method as claimed in claim 2, wherein force exerted by the waves on the at least one mobile device is predicted by at least one of measurement or estimation of the force exerted by the waves on the at least one mobile device, by using pressure detectors adjacent the at least one mobile device or force sensors between the at least one mobile device and the at least one energy converter machine.

7. A method as claimed in claim 3, wherein force exerted by the waves on the at least one mobile device is predicted by at least one of measurement or estimation of the force exerted by the waves on the at least one mobile device, by using pressure detectors adjacent the at least one mobile device or force sensors between the at least one mobile device and the at least one energy converter machine.

8. A method as claimed in claim 4, wherein force exerted by the waves on the at least one mobile device is predicted by at least one of measurement or estimation of the force exerted by the waves on the at least one mobile device, by using pressure detectors adjacent the at least one mobile device or force sensors between the at least one mobile device and the at least one energy converter machine.

9. A method as claimed in claim 1, wherein the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x and y being the state vectors of the wave energy system with the at least one energy converter machine, u being the control value of the force exerted by the at least one energy converter machine on the at least one mobile device, w being the excitation force of incident waves on the at least one mobile device, Ac, Bcu, Bcw, and Cc being matrices for multiplying the state and inputs of the dynamic model allowing calculation of a dynamic variation of the state and the outputs of the dynamic model.

10. A method as claimed in claim 2, wherein the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x and y being the state vectors of the wave energy system with the at least one energy converter machine, u being the control value of the force exerted by the at least one energy converter machine on the at least one mobile device, w being the excitation force of incident waves on the at least one mobile device, Ac, Bcu, Bcw, and Cc being matrices for multiplying the state and inputs of the dynamic model of the wave energy system allowing calculation of a dynamic variation of the state and the outputs of the dynamic model of the wave energy system.

11. A method as claimed in claim 3, wherein the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x and y being the state vectors of the wave energy system with the at least one energy converter machine, u being the control value of the force exerted by the at least one energy converter machine on the at least one mobile device, w being the excitation force of incident waves on the at least one mobile device, Ac, Bcu, Bcw, and Cc being matrices for multiplying the state and inputs of the dynamic model of the wave energy system allowing calculation of a dynamic variation of the state and the outputs of the dynamic model of the wave energy system.

12. A method as claimed in claim 4, wherein the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x and y being the state vectors of the wave energy system with the at least one energy converter machine, u being the control value of the force exerted by the at least one energy converter machine on the at least one mobile device, w being the excitation force of incident waves on the at least one mobile device, Ac, Bcu, Bcw, and Cc being matrices for multiplying the state and inputs of the dynamic model of the wave energy system allowing calculation of a dynamic variation of the state and the outputs of the dynamic model of the wave energy system.

13. A method as claimed in claim 5, wherein the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x and y being the state vectors of the wave energy system with the at least one energy converter machine, u being the control value of the force exerted by the at least one energy converter machine on the at least one mobile device, w being the excitation force of incident waves on the at least one mobile device, Ac, Bcu, Bcw, and Cc being matrices for multiplying the state and inputs of the dynamic model of the wave energy system allowing calculation of a dynamic variation of the state and the outputs of the dynamic model of the wave energy system.

14. A method as claimed in claim 6, wherein the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x and y being the state vectors of the wave energy system with the at least one energy converter machine, u being the control value of the force exerted by the at least one energy converter machine on the at least one mobile device, w being the excitation force of incident waves on the at least one mobile device, Ac, Bcu, Bcw, and Cc being matrices for multiplying the state and inputs of the dynamic model of the wave energy system allowing calculation of a dynamic variation of the state and the outputs of the dynamic model of the wave energy system.

15. A method as claimed in claim 7, wherein the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x and y being the state vectors of the wave energy system with the at least one energy converter machine, u being the control value of the force exerted by the at least one energy converter machine on the at least one mobile device, w being the excitation force of incident waves on the at least one mobile device, Ac, Bcu, Bcw, and Cc being matrices for multiplying the state and inputs of the dynamic model of the wave energy system allowing calculation of a dynamic variation of the state and the outputs of the dynamic model of the wave energy system.

16. A method as claimed in claim 8, wherein the dynamic model of the wave energy system is written as:

$$\begin{cases} \dot{x}(t) = A_c x(t) + B_{cu} u(t) + B_{cw} w(t) \\ y(t) = C_c x(t) \end{cases},$$

with x and y being the state vectors of the wave energy system with the at least one energy converter machine, u being the control value of the force exerted by the at least one energy converter machine on the at least one mobile device, w being the excitation force of incident waves on the at least one mobile device, Ac, Bcu, Bcw, and Cc being matrices for multiplying the state and inputs of the dynamic model of the wave energy system allowing calculation of a dynamic variation of the state and the outputs of the dynamic model of the wave energy system.

17. A method as claimed in claim 1, wherein the dynamic model of the wave energy system incorporates dynamics of the at least one energy converter machine which consider quasi-instantaneous control of the at least one energy converter machine in relation to dynamics of the wave energy system.

18. A method as claimed in claim 1, wherein the energy model is expressed by a relationship:

$$P_a = -\frac{1}{T} \int_{t=0}^{T} \eta u_a v \, dt,$$

with $P_a$ being the average power generated, t being time, T being a predetermined duration, $\eta$ being energy conversion efficiency, $u_a$ being force exerted by the at least one energy converter machine on the at least one mobile device and v being velocity of the at least one mobile device in relation to the at least one energy converter machine.

19. A method as claimed in claim 18, wherein the efficiency $\eta$ is a function of force $u_a$ exerted by the at least one energy converter machine on the at least one mobile device and of velocity v of the at least one mobile device in relation to the at least one energy converter machine.

20. A method as claimed in claim 19, wherein efficiency η is calculated with a formula:

$$\eta(u_a v) = \begin{cases} \eta_p & \text{if } u_a v \geq 0 \\ \eta_n & \text{if } u_a v < 0 \end{cases},$$

with $\eta_p$ being motor efficiency of the at least one energy converter machine, $\eta_n$ being the generator efficiency of the at least one energy converter machine, with $0 < \eta_p \leq 1$ and $\eta_n \geq 1$.

21. A method as claimed in claim 1, wherein the method comprises a prior step of optimizing the weighting coefficients using an algorithm, particle swarm optimization, variable neighborhood search, or the Nelder-Mead method.

22. A method as claimed in claim 1, wherein steps c), d) and e) are repeated to provide a predictive control with a moving horizon.

23. A method as claimed in claim 1, wherein the energy converter machine is an electrical or hydraulic machine.

* * * * *